(12) United States Patent
McCreadie et al.

(10) Patent No.: US 6,378,189 B1
(45) Date of Patent: Apr. 30, 2002

(54) CABLE HANDLING APPARATUS AND METHOD OF HANDLING CABLE

(75) Inventors: Philip McCreadie; Andrew Robert Voizey, both of Yeovil (GB)

(73) Assignee: GKN Westland Helicopters Limited, Yeovil (GB)

(*) Notice: Subject to any disclaimer, the term of this patent is extended or adjusted under 35 U.S.C. 154(b) by 0 days.

(21) Appl. No.: 09/501,263

(22) Filed: Feb. 9, 2000

(30) Foreign Application Priority Data

Feb. 9, 1999 (GB) .............................................. 9902731

(51) Int. Cl.⁷ ........................ B23Q 17/00; G01M 19/00; B23P 21/00
(52) U.S. Cl. ................ 29/407.05; 29/407.01; 29/720; 29/721; 29/593
(58) Field of Search ............................. 29/407.01, 720, 29/721, 593, 407.05, 407.09; 33/759, 760, 787, 790, 809–812, 296

(56) References Cited

U.S. PATENT DOCUMENTS

| | | | | |
|---|---|---|---|---|
| 4,471,532 A | * | 9/1984 | Francis | .......................... 33/296 |
| 4,914,867 A | | 4/1990 | Saito et al. | |
| 5,642,569 A | * | 7/1997 | Palmer | .......................... 33/296 |

FOREIGN PATENT DOCUMENTS

| | | | |
|---|---|---|---|
| GB | 2 284 776 A | | 6/1995 |
| JP | 11023883 | * | 1/1999 |

* cited by examiner

*Primary Examiner*—S. Thomas Hughes
*Assistant Examiner*—John C. Hong
(74) *Attorney, Agent, or Firm*—Larson & Taylor, PLC

(57) ABSTRACT

A handling apparatus for handling cables includes first and second members connected together for relative movement between an open position in which a cable may be inserted between the members, and a closed position in which the cable is securely held between the members with a part of the cable projecting outwardly of the members, to enable the first and second members to be held whilst work operations are carried out on the projecting part, the apparatus further including an elongate indicating device received by the first member for axial sliding movement relative to the first member, the indicating device having an indicator and a plurality of markings arranged at predetermined positions axially of the indicating device, the indicating means being slidable so as to bring the markings severally into registry with a reference part of the first member whereby the indicator is positionable relative to the first member at predetermined positions relative to the projecting part of the cable when the first and second members are closed together, so that the indicator may indicate appropriate portions of the a projecting part on which particular work operations are to be carried out.

9 Claims, 3 Drawing Sheets

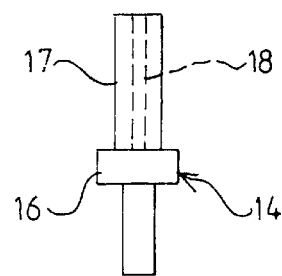
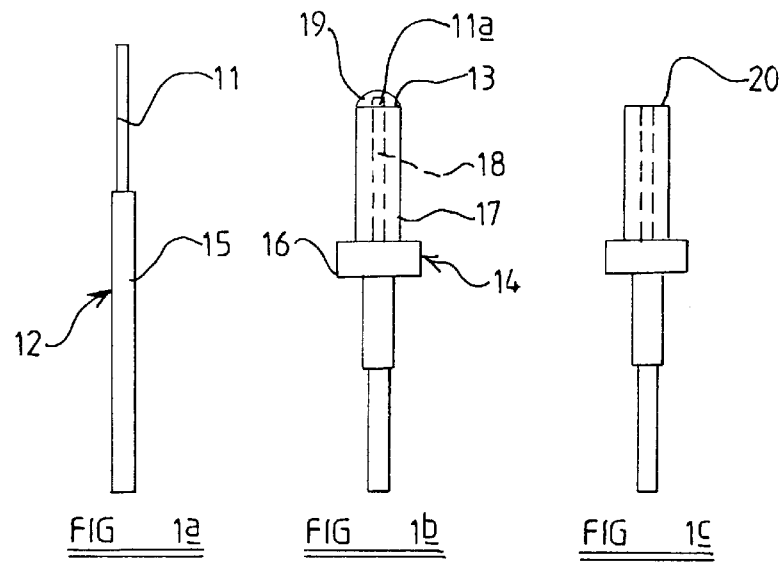
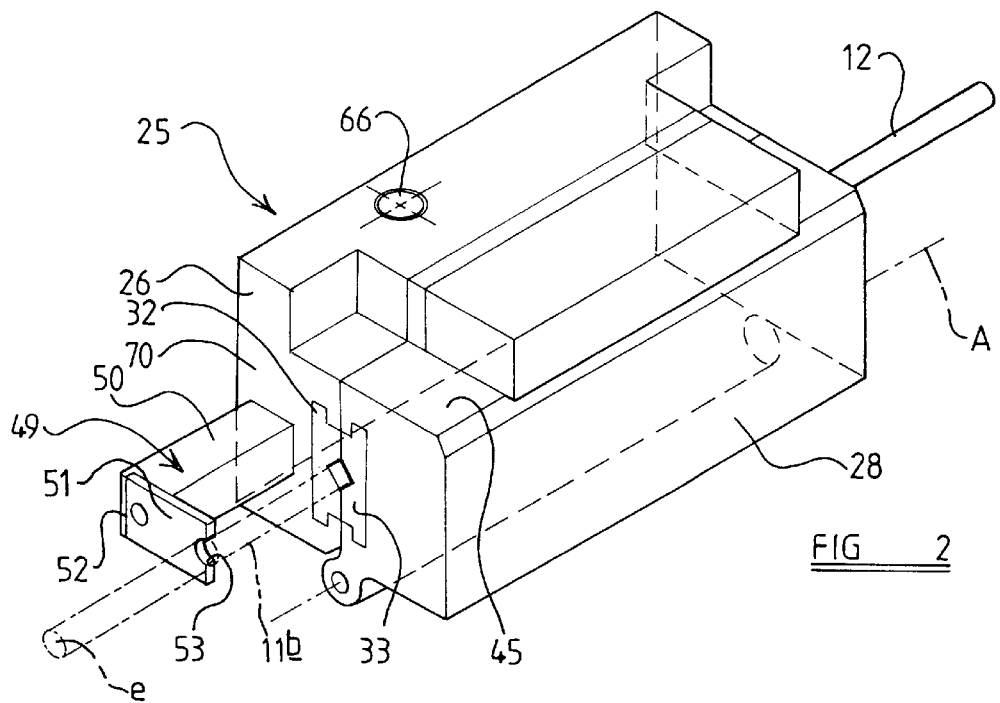

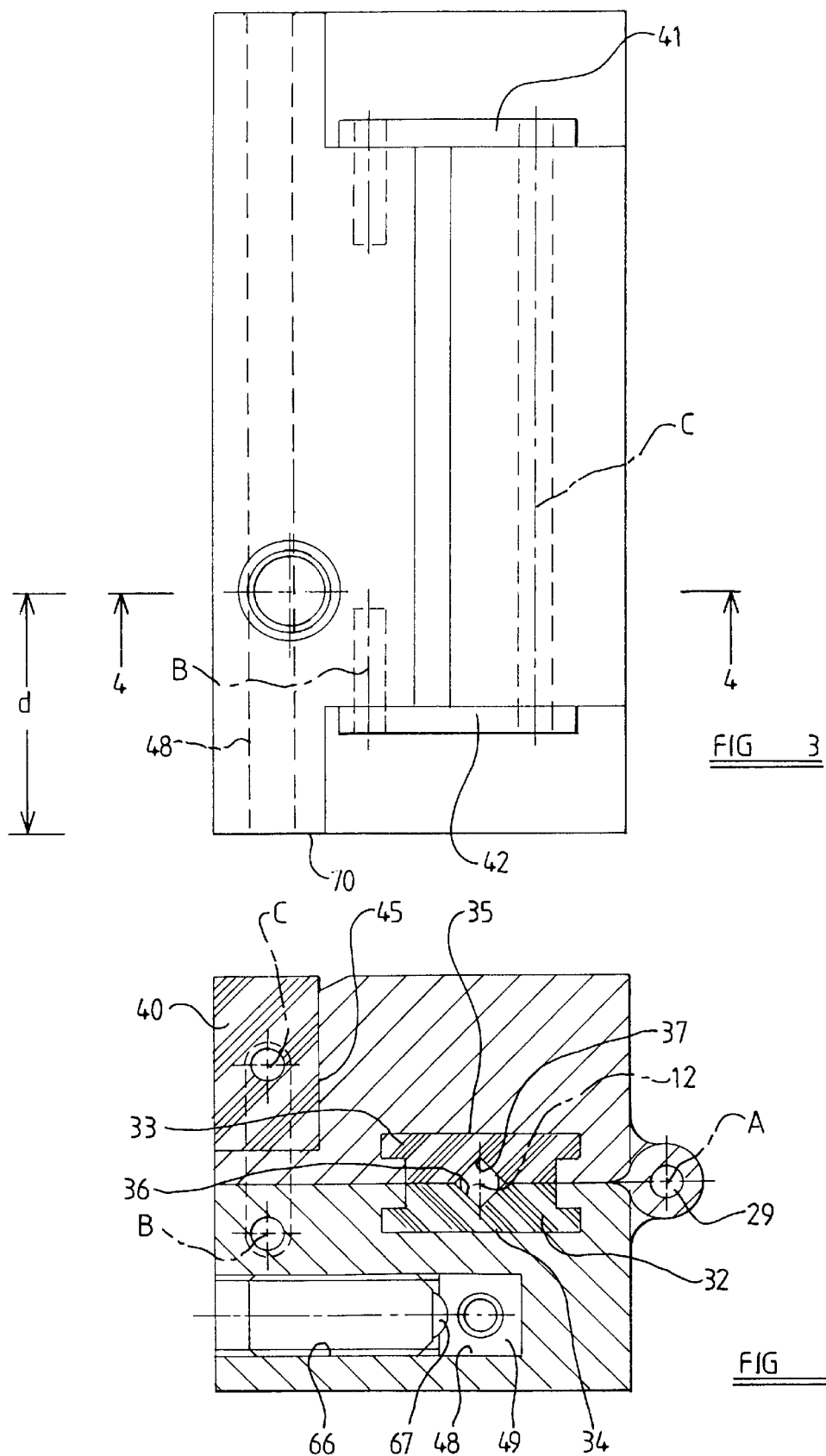

CABLE HANDLING APPARATUS AND METHOD OF HANDLING CABLE

BACKGROUND TO THE INVENTION

This invention relates to a cabling handling apparatus and to a method of using the same.

DESCRIPTION OF THE PRIOR ART

The invention primarily but not exclusively relates to such an apparatus and method for handling fibre optic cables which comprise a fibre including a core and cladding with a different refractive index, the fibre being covered with one or more outer layers which give the fibre optical and mechanical protection.

Fibre optic cables are used to transmit data as pulses of light along the core, which fibre may have a diameter of only 50–300 microns. Also, such fibres are typically made of glass fibre. Thus such cables require particularly careful handling.

To allow such cables to be joined to another cable or to a receptor of an optical data handling apparatus, a fibre optic cable is terminated in a termination through which the fibre extends to an optical end surface. The outer protective layer or layers may be mechanically retained by the termination.

It is desirable to be able to attach a termination to the end of the fibre optic cable in situ, for example on-board an aircraft, perhaps in confined conditions.

Conventionally, to perform work operations on a fibre optic cable in such circumstances requires considerable manual dexterity and because there may be little spare length of fibre optic cable, reworking of cable terminations may not be possible.

SUMMARY OF THE INVENTION

According to a first aspect of the invention we provide a handling apparatus for handling cables including first and second members connected together for relative movement between an open position in which a cable may be inserted between the members, and a closed position in which the cable is securely held between the members with a part of the cable projecting outwardly of the members, whereby the first and second members may be held whilst work operations are carried out on the projecting part, the apparatus further including an elongate indicating means received by the first member for axial sliding movement relative to the first member, the indicating means having an indicator and a plurality of markings arranged at predetermined positions axially of the indicating means, the indicating means being slidable so as to bring the markings severally into registry with a reference part of the first member whereby the indicator is positionable relative to the first member at predetermined positions relative to the projecting part of the cable when the first and second members are closed together, so that the indicator may indicate appropriate portions of the projecting part on which particular work operations are to be carried out.

Thus utilizing the apparatus of the present invention, the cable may be securely held by the apparatus which in turn may be more easily handled by an operative. Because of the provision of the indicating means, an operative may readily ensure that only a desired length of the outer layer for example of a fibre optic cable is removed from the core in a work operation for a particular cable termination type. Thus the indicating means may be specific to a cable type and termination type, but may be interchangeable with an alternative indicating means for alternative cable and termination types.

Preferably retaining means are provided to retain the first and second members in their closed position. Such a retaining means may comprise a clamping member which is connected to one of the first and second members, so as to be moveable into a retaining condition in which the clamping member engages with the other of the first and second members to retain the first and second members in their closed position.

For example the clamping member may be connected to the one member by link means, the link means being pivotally connected at or towards one end to the first or second member and at or towards an opposite end to the clamping member. Thus the other of the first and second members with which the clamping member engages, may have a recess in which the clamping member may be received when in the retaining condition.

However alternative means to maintain the first and second members closed may be provided although the arrangement described is particularly useful where at least one of the first and second members provides an elongate recess along which the cable extends when held between the members. The first and/or second member may include resilient material which is resiliently deformed when the first and second members are closed together with the cable therebetween, the resilient material being provided by an insert which includes the recess for the cable.

The indicating means may include an elongate body received in an axially extending opening of the first member, the opening extending generally parallel to the cable, and the markings being provided along the body. The indicator may be provided on a transversely extending part of the indicating element, which transversely extending part extends towards the projecting part of the cable. Thus the indicator may readily indicate e.g. a position along the projecting part where the portion on which a work operations is to be carried out, commences.

The body of the indicating means may have provided therealong, a recess corresponding to each marking, and the first member may have resiliently biased detent means severally engageable with each such recess, so that when the indicating element is slid so as to bring a marking into registry with the reference part of the body, the indicator is positively held at the predetermined position by the engagement of the detent in a corresponding recess. Of course other means to facilitate sliding of the indicating means and retention of the indicating means in a desired position may alternatively be employed, although the arrangement described is particularly simple in construction.

According to a second aspect of the invention we provide a method of handling a cable to facilitate the performing of a work operation thereon using a cable handling apparatus according to the first aspect of the invention characterised in that the method comprises opening the first and second members, inserting the cable therebetween with a part of the cable projecting outwardly, closing the first and second members securely to hold the cable, sliding the indicating means to bring a marking appropriate to a work operation to be carried out into registry with the reference part of the first member, so that the indicator of the indicating means indicates an appropriate portion of the cable on which to perform the work operation.

The invention is particularly useful for handling a fibre optic cable during the preparation of such a cable for termination in a cable termination.

Thus according to a third aspect of the invention we provide a method of terminating a fibre optic cable which includes a fibre including a core and at least one outer protective layer, in a termination which includes a first part for receiving the cable including the outer layer, and a second part for receiving a projecting fibre part so that the fibre extends to an optical end surface of the second termination part, the first and second termination parts being axially arranged, the method including performing a work operation on the fibre optic cable to remove the outer layer to leave a desired length of projecting fibre, characterised in that to perform the work operation, the cable is inserted between first and second members of a cable handling apparatus according to the first aspect of the invention and the indicating means thereof is slid to a predetermined position relative to the first member and with a marking thereof in registry with the reference part so that the indicator indicates a portion of the projecting part of the cable which corresponds in length to the desired projecting fibre length, and the outer layer is removed from the indicated portion using a tool to leave the projecting fibre projecting from an end of the remainder of the cable.

In order that the very end of the fibre is in perfect condition for light transmission, the fibre has carefully to be cut to ensure that the core is not split or cracked, which such damage could result in data loss or corruption. Such careful cutting is conventionally performed after the fibre has been inserted into a termination, by what is known as a cleaving process. Whereas the method of the invention may be applied where the fibre is cleaved subsequent to insertion into the termination, preferably subsequent to performing the work operation to remove the outer layer, a further work operation is carried out, the further work operation including cleaving the projecting fibre to a length such that when the cable is received in the termination, a desired length of the projecting fibre extends from the optical end surface of the second part of the termination, the method including, subsequent to performing the first work operation, sliding the indicating element to bring a second marking into registry with the reference part, so that indicator indicates an appropriate position of the projecting fibre at which to cleave the fibre.

Thus the fibre may be cleaved to the final desired length prior to insertion into the termination.

Desirably, to ensure that the cleaved end of the fibre is not prone to damage subsequent to being inserted into the termination, e.g. while adhesive in which the fibre is conventionally set cures, the method may include inserting into the second part of the termination ahead of the projecting fibre part, an adhesive, the projecting fibre when inserted into the second part of the termination, causing some of the adhesive to flow from the second part onto the optical end surface of the second part, the position of the second marking of the indicating means being such that the projecting fibre is of such length as a result of cleaving, the projecting fibre which extends from the optical end surface of the termination is within the adhesive on the optical end surface.

Where the cable has a plurality of outer protective layers, a different length of each of which requires removal, the method may include, subsequent to performing a first work operation to remove an outermost layer thereof, performing at least one subsequent work operation to remove a different length of an inner outer layer, the method including subsequent to performing the first work operation, sliding the indicating means to bring another marking into registry with the reference part, so that the indicator indicates an appropriate portion of the cable from which to remove the inner outer layer in a subsequent work operation.

According to a fourth aspect of the invention we provide a method of terminating a fibre optic cable which includes a fibre and at least one outer protective layer, in a termination which includes a first part for receiving the cable including the outer layer, and a second part for receiving a projecting fibre only so that the fibre extends to an optical end surface of the second termination part, the first and second termination parts being axially arranged, characterised in that the method includes subsequent to performing a work operation to remove the outer layer, carrying out a further work operation, the further work operation including cleaving the projecting fibre to a length such that when the cable is received in the termination, a desired length of the projecting fibre extends from the all optical end surface of the second part of the termination.

BRIEF DESCRIPTION OF THE DRAWINGS

The invention will now be described with the aid of the accompanying drawings in which:

FIGS. 1a to 1c is a schematic illustration of a fibre optic termination procedure during which a cable handling apparatus in accordance with the invention may be used;

FIG. 2 is a perspective view of a cable handling apparatus in accordance with the invention;

FIG. 3 is a plan view of the apparatus of FIG. 2;

FIG. 4 is a cross sectional view taken on the lines 4—4 of FIG. 3;

DESCRIPTION OF THE PREFERRED EMBODIMENTS

Figure 5A:
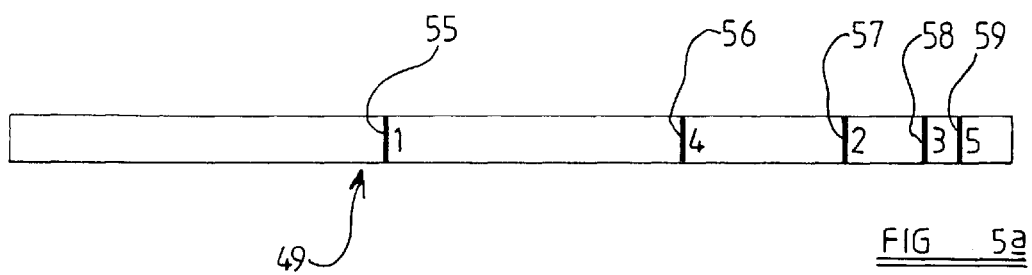
FIGS. 5a and 5b are plan and side views of an indicating means of the apparatus of FIGS. 2 to 4.
Figure 5B:
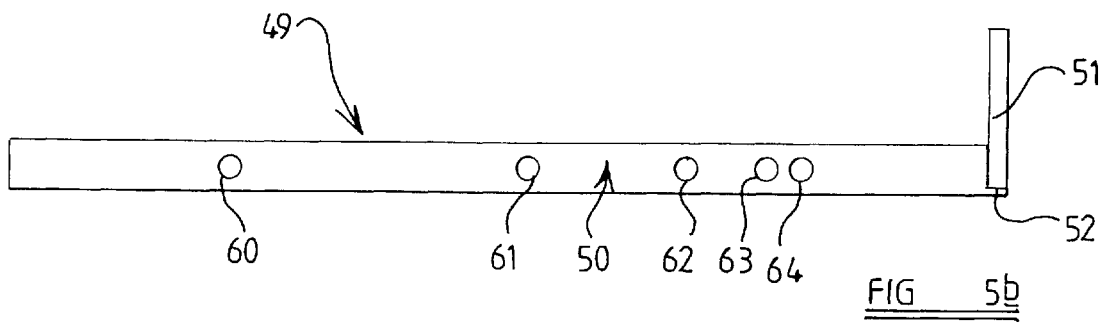

Referring to FIG. 1 of the drawings, a typical fibre optic termination procedure is schematically illustrated.

First, a fibre optic cable 12 is prepared by stripping back outer layers 15 thereof to leave a projecting fibre 11 which typically includes a core and cladding having a different refractive index. The projecting fibre 11 is then inserted into a termination 14 which in the example shown in FIG. 1 is a metal ferrule 16 having a ceramic part 17 with a central opening 18 to receive the fibre 11. The ferrule 16 has a female screw thread (not seen) by which the termination 14 is connectable to a corresponding male threaded termination of another fibre optic cable, or a male threaded part of a data handling machine or the like.

The projecting fibre 11 is such that when inserted, with the outer layers 15 received by the ferrule 16, a portion 11a of the fibre 11 projects outwardly of an optical end surface 13 of the ceramic part 17 as seen in FIG. 1b.

The fibre 11 is set in the ceramic part 17 by means of an adhesive, usually an epoxy adhesive, which may be introduced into the ferrule 16 ahead of the fibre 11, so that as the fibre 11 is introduced, some of the adhesive is ejected from the opening 18 in the ceramic 17, as indicated at 19 in FIG. 1b, to form a dome of adhesive on the optical end surface 13. For the reasons hereinafter explained, the entire portion 11a of the projecting fibre 11 is within the dome 19 of adhesive.

Next the cable 12 may be mechanically secured relative to the termination 14 e.g. by means of a clamping ring (not shown) which clamps the cable 12 to the ferrule 16, or otherwise, and the epoxy 19 is cured by applying heat, or is simply allowed to cure. The dome 19 of adhesive and the portion 11a of the fibre 11 can then be polished to an optical flat 20 as indicated in FIG. 1c.

To facilitate handling of the fibre optic cable 12 during preparation of the cable for insertion into the termination 14, a cable handling apparatus 25 is provided. The cable handling apparatus 25 comprises a first member 26, and a second member 28, with a hinge 29 provided between them whereby the first and second members 26, 28 may be relatively moved between an open position in which the fibre optic cable 12 may be inserted between the members 26, 28, and a closed position as seen in the drawings in which the cable 12 is securely held by the apparatus 25.

The first and second members 26, 28 at least when closed, are of a convenient size and configuration for manual handling, being generally elongate in the direction of a hinge axis A, and thus manual handling of the held cable 12 is facilitated.

The first and second members 26,28 each have resilient material in this example in the form of respective inserts 32,33 of an elastomeric material received in re-entrant channels 34,35 in the respective first 26 and second 28 members. The inserts 32,33 each provide a shallow recess 36,37 for the cable 12, but in another example, only one of the inserts 32,33 may have such a recess, or neither may have such a recess where the material of the inserts 32,33 is appropriately resilient whilst being able securely to hold the cable 12 when the first and second members 26,28 are closed together.

The first and second members 26,28 are in use retained in the closed position by a clamping bar 40 which is connected to the first member 26 in this example, by a pair of links 41,42, each link 41,42 being pivoted both to the first member 26 about axis B, and to the clamping bar 40 about an axis C. By virtue of this connection, the clamping bar 40 may be manoeuvred against resistance of the resilient inserts 32,33 into engagement with a clamping recess 45 of the second member 28 which is shaped similarly to the relevant engaging surfaces of the clamping bar 40.

When the first and second members 26,28 are in the closed condition shown, the inserts 32,33 will be slightly resiliently deformed. When a cable 12 is present in the recesses 36,37 provided by the inserts 32,33, the inserts 32,33, will thus be urged into close engagement with the cable 12, thus securing the cable 12.

Within the first member 26 there is a receiving means being an elongate generally axially extending opening 48, for an indicating means 49. The indicating means comprises a body 50 which is slidable in the opening 48, and the body 50 has an indicator 51 in the form of a transversely extending part, at an outer free end 52 of the body 50, which indicator 51 extends towards a cable 12 when received between the first and second members 26,28 as hereinafter described. The indicator 51 in this example has a V-shaped notch 53, and a part of the cable 12 which projects from the members 26,28 may be received in the notch 53, as hereinafter explained.

The indicating means 49 has marked at various axial positions along the body 50, markings 55–59, i.e. five in this example. The markings 55–59 may be provided by engraving and/or a marking agent or ink. In the example shown, the markings 55–59 have number identifiers, which are not consecutive along the body 50, but uniquely identify the particular markings 55–59.

Also, the indicating means 49 has provided along the body 50, a series of detents 60–64, again five in this example. The detents 60–64 are spaced from one another axially along the body 50 identically to the markings 55-59, but the series of detents 60–64 is offset in a direction away from the indicator 51 at the outer free end 52 of the indicating means 49.

Within the first member 26 there is provided a bore 66 which extends generally normally to the opening 48 which receives the indicating means 49. Within the bore 66 there is a sprung plunger 67. Thus as the indicating means 49 is slid in the opening 48, the sprung plunger 67 will be urged into the detents 60–64. The force of the spring Liigiing the plunger 67 is not so great that the indicating means 49 becomes fixed in any one sliding position, but when the plunger 67 is engaged in any of the detents 60–64, the position of the indicating means 49 will be set until the indicating means 49 is forcible slid from that position.

It will be appreciated that as the indicating means 49 is slid in and out of its opening 48, different of the markings 55–59 will come into register with a reference part 70 which in this example comprises an edge of the opening 48 for the indicating means 49. The offset of the series of recesses 60–64 along the body 50 from the markings 55–59 corresponds to the distance d of the bore 66 for the plunger 67 from the reference part 70. Thus when any of the markings 55–59 is in register with the reference part 70, the sprung plunger 67 will be engaged in a corresponding recess 60–64 to retain the indicating means 49 in that position.

Use of the apparatus 10 may be as follows.

First, with the first and second members 26,28 in an open condition, the cable 12 is inserted so as to extend along the recesses 36,37 of the elastomeric inserts 32,33 with a part 11b of the cable 12 projecting outwardly of the members 26,28. Then the first and second members 26,28 are closed and clamped together by the clamping bar 40.

The indicating means 49 is then slid in its opening 48 until a marking 55 which is referenced "1" is in registry with the reference part 70, so that the plunger 67 is engaged in recess 60.

The indicator 51 will then indicate a position along the projecting cable length 11b being the end point of a portion of the projecting cable length 11b, upon which, using a suitable cutting tool, a first work operation may then be carried out. Typically this would involve removal of an outermost pvc sheath covering the cable 12, along a portion of the cable 12 from the indicated position of the projecting part 11b to the cable end e.

When this has been achieved using a suitable stripping tool, the indicating means 49 is slid in the opening 48 to position "2" i.e. with marking 57 in registry with the reference part 70 and the plunger 67 engaged in recess 62. Thus the indicator 51 will now indicate a further portion of the projecting cable part 11b.

A second work operation may then be carried out on the further portion of the cable 12, such as the removal of an inner outer layer of the cable 12 again using a suitable shipping tool or the like.

Further work operations may similarly be carried out on yet further portions of the projecting cable length 11b, indicated by sliding the indicating means 49 to appropriate positions, for example to strip back a plurality of i.e. usually two or three outer protective layers of the cable 12 to different lengths, to leave a projecting inner fibre 11, in each case the indicating means 49 being slid to bring an appropriate marking into registry with the reference surface 70, and hence the indicator 51 to an appropriate position of the projecting cable part 11b to indicate an appropriate portion of the part 11b.

A final work operation may involve cleaving the projecting fibre 11 to a desired length.

By sliding the indicating means 49 to position "5" i.e. with marking 59 in registry with the reference surface 70 and the plunger 67 in engagement with the recess 64, so that the indicator 51 indicates a desired cleaving position, a suitable cleaving tool may then be used to cleave the fibre 11 at the indicated position so that when the projecting fibre is subsequently received in the second, ceramic, part 17 of the termination 14, only the projecting portion 11a seen in FIG.

1, projects from the optical end surface 20, within the dome 19 of adhesive.

It will be appreciated that the actual positions of the markings 55–59 and of the recesses 60–64 depend on the type of termination 14 used, the kind of fibre optic cable 12, and also the nature of the tools used to perform the working operations.

Thus desirably, the indicating means 49 is removable from the opening 48, and exchangeable with an alternative indicating means 49 appropriate to an alternative type of termination 14 and/or cable type and/or tooling. A cage may thus be required to retain the plunger 67 when the indicating means 49 is removed from the opening 48.

Conventionally, cleaving of the projecting fibre 11 is carried out subsequent to the fibre 11 being inserted into the termination 14, and subsequent to the adhesive 19 curing. Particularly but not exclusively by virtue of the handling apparatus 10 of the present invention, the fibre 11 may be cleaved to its final desired length before insertion into the termination 14. The portion 11a which projects from the termination end surface 13 is relatively so small compared to that in a conventional method, that the risks of damage to the fibre 11 are reduced, and of course wastage of fibre 11 may be minimised.

Various modifications in addition to those already mentioned may be made without departing from the scope of the invention. For example, the first and second members 26,28 may be of different configurations to those shown in the drawings which are given by way of example only. The first and second members 26,28 made be connected for open and closing by other than the hinge means 29 illustrated, and an entirely different clamping means 40 may be provided if required.

What is claimed is:

1. A handling apparatus for handling cables wherein the apparatus includes first and second members connected together for relative movement between an open position in which a cable may be inserted between the members, and a closed position in which the cable is securely held between the members with a part of the cable projecting outwardly of the members, whereas the first and second members may be held whilst work operations are carried out on the projecting part, the first member having an opening extending generally parallel to the cable, the apparatus further including an elongate indicating means received by the opening in the first member for axial sliding movement relative to the first member, the indicating means having an indicator extending transversely with respect to the projecting part of the cable and an elongate indicator body having a plurality of markings arranged at predetermined positions axially thereon, the indicating means being slidable so as to bring the markings severally into registry with a reference part of the first member whereby the indicator is positionable relative to the first member at predetermined positions relative to the projecting part of the cable when the first and second members are closed together, so that the indicator may indicate appropriate portions of the projecting part on which particular work operations are to be carried out.

2. An apparatus according to claim 1 wherein retaining means are provided to retain the first and second members in their closed position.

3. An apparatus according to claim 2 wherein the retaining means comprises a clamping member which is connected to one of the first and second members, so as to be moveable into a retaining condition in which the clamping member engages with the other of the first and second members to retain the first and second members in their closed position.

4. An apparatus according to claim 3 wherein the clamping member is connected to the one member by link means, the link means being pivotally connected at or towards one end to the first or second member and at or towards an opposite end to the clamping member.

5. An apparatus according to claim 3 wherein the other of the first and second members with which the clamping member engages, has a recess in which the clamping member is received when in the retaining condition.

6. An apparatus according to claim 1 wherein at least one of the first and second members provides an elongate recess along which the cable extends when held between the members.

7. An apparatus according to claim 6 wherein the first and/or second member includes resilient material which is resiliently deformed when the first and second members are closed together with the cable therebetween the resilient material being provided by an insert which includes the recess for the cable.

8. An apparatus according to claim 1 wherein the body of the indicating means has provided therealong, a recess corresponding to each marking, and the first member has resiliently biased detent means severally engageable with each such recess, so that when the indicating means is slid so as to bring a marking into registry with the reference part of the body, the indicating means is positively held at the predetermined position by engagement of a detent in a corresponding recess.

9. A method of handling a cable to facilitate performing of a work operation thereon using a cable handling apparatus including first and second members connected together for relative movement between an open position in which a cable may be inserted between the members, and a closed position in which the cable is securely held between the member with a part of the cable projecting outwardly of the members, whereas the first and second members may be held whilst work operations are carried out on the projecting part, the first member having an opening extending generally parallel to the cable, the apparatus further including an elongate indicating means received by the opening in the first member for axial sliding movement relative to the first member, the indicating means having an indicator extending transversely with respect to the projecting part of the cable and an elongate indicator body having a plurality of markings arranged at predetermined positions axially thereon, the indicating means being slidable so as to bring the markings severally into registry with a reference part of the first member whereby the indicator is positionable relative to the first member at predetermined positions relative to the projecting part of the cable when the first and second members are closed together, so that the indicator may indicate appropriate portions of the projecting part on which particular work operations are to be carried out, wherein the method comprises opening the first and second members, inserting the cable therebetween with a part of the cable projecting outwardly, closing the first and second members securely to hold the cable, sliding the indicating means to bring a marking appropriate to a work operation to be carried out into registry with the reference part of the first member, so that the indicator of the indicating means indicates an appropriate portion of the projecting part of the cable on which to perform the work operation.

* * * * *